(12) United States Patent
Jakupca et al.

(10) Patent No.: US 8,563,637 B2
(45) Date of Patent: Oct. 22, 2013

(54) ALKYLPHENOL FREE-LIQUID POLYMERIC PHOSPHITE POLYMER STABILIZERS

(75) Inventors: Michael Jakupca, Canton, OH (US);
Jacob M. Lance, Dover, OH (US);
Donald Stevenson, Dover, OH (US)

(73) Assignee: Dover Chemical Corporation, Dover, OH (US)

( * ) Notice: Subject to any disclaimer, the term of this patent is extended or adjusted under 35 U.S.C. 154(b) by 0 days.

(21) Appl. No.: 12/907,343

(22) Filed: Oct. 19, 2010

(65) Prior Publication Data

US 2011/0263760 A1    Oct. 27, 2011

Related U.S. Application Data

(60) Provisional application No. 61/306,014, filed on Feb. 19, 2010.

(51) Int. Cl.
| | |
|---|---|
| *C08K 5/524* | (2006.01) |
| *C08K 5/3475* | (2006.01) |
| *C07F 9/141* | (2006.01) |
| *C08L 23/06* | (2006.01) |
| *C08L 23/12* | (2006.01) |

(52) U.S. Cl.
USPC ............ 524/128; 549/222; 558/156; 558/158

(58) Field of Classification Search
USPC ................ 524/128; 549/222; 558/156, 158
See application file for complete search history.

(56) References Cited

U.S. PATENT DOCUMENTS

| | | | |
|---|---|---|---|
| 3,359,348 A | 12/1967 | Friedman | |
| 3,855,360 A | 12/1974 | Shim | |
| 5,969,015 A | 10/1999 | Zinke et al. | |
| 6,541,549 B2 | 4/2003 | Archibald et al. | |
| 6,770,693 B2 | 8/2004 | Stein et al. | |
| 7,119,170 B2 | 10/2006 | Feder et al. | |
| 7,186,853 B2 | 3/2007 | Enlow et al. | |
| 7,199,170 B2 | 4/2007 | Archibald et al. | |
| 7,468,410 B2 | 12/2008 | Chafin et al. | |
| 2007/0088108 A1 | 4/2007 | Evans et al. | |
| 2008/0071016 A1 | 3/2008 | Boettcher et al. | |
| 2009/0326112 A1 | 12/2009 | Gelbin et al. | |
| 2010/0004363 A1 | 1/2010 | Gelbin et al. | |
| 2010/0025636 A1 | 2/2010 | Gelbin et al. | |
| 2010/0069542 A1 | 3/2010 | Gelbin et al. | |
| 2010/0076131 A1 | 3/2010 | Gelbin et al. | |
| 2010/0190900 A1 | 7/2010 | Gelbin et al. | |
| 2010/0240810 A1 | 9/2010 | King et al. | |

FOREIGN PATENT DOCUMENTS

| | | |
|---|---|---|
| WO | 2007009916 A1 | 1/2007 |
| WO | 2008028858 A1 | 3/2008 |

OTHER PUBLICATIONS

International Search Report and Written Opinion dated Mar. 3, 2011 for corresponding application PCT/US10/53207.
International Preliminary Report on Patentability for application PCT/US2010/053207 dated Aug. 21, 2012.

*Primary Examiner* — Kriellion Sanders
(74) *Attorney, Agent, or Firm* — Hahn Loeser & Parks LLP

(57) ABSTRACT

An alkylphenol-free liquid polymeric phosphite is described of general Structure IV illustrated below

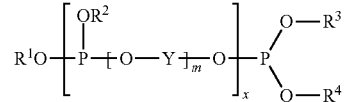

wherein each $R^1$, $R^2$, $R^3$ and $R^4$ can be the same or different and independently selected from the group consisting of $C_{1-20}$ alkyl, $C_{3-22}$ alkenyl, $C_{6-40}$ cycloalkyl, $C_{7-40}$ cycloalkylene, $C_{1-20}$ methoxy alkyl glycol ethers, $C_{1-20}$ alkyl glycol ethers, and or Y—OH; Y is selected from the group consisting of $C_{2-40}$ alkylene, $C_{2-40}$ alkyl lactone, —$R^7$—N($R^8$)—$R^9$—, wherein $R^7$, $R^8$ and $R^9$ are independently selected from the group previously defined for $R^1$, $R^2$, $R^3$ and $R^4$, now further including H; m is an integral value ranging from 2 to 100 inclusive; and x is an integral value ranging from 1 to 1,000. The alkylphenol-free liquid polymeric phosphite is useful in reducing phosphite migration within polymers.

28 Claims, No Drawings

ALKYLPHENOL FREE-LIQUID POLYMERIC PHOSPHITE POLYMER STABILIZERS

CROSS-REFERENCE TO RELATED APPLICATIONS

This application claims priority to and incorporates by reference, pending U.S. Patent Application Ser. No. 61/306,014 filed on 19 Feb. 2010.

TECHNICAL FIELD

The invention described herein pertains generally to an improved polymer composition which contains at least one liquid polymeric phosphite additive which is selected from the group of all alkyl polymeric phosphites as antioxidant additives and a method for the preparation thereof.

BACKGROUND OF THE INVENTION

At least one purpose associated with the addition of a stabilizer to a polymeric resin is to prevent deterioration of the polymers derived from the resin during processing at high temperatures and also to permit the manufacture of products with increased intrinsic quality attributable at least in part to increased resistance to thermal and light degradation during their intended use.

Many organic phosphites have been used as stabilizers, and most are based on alkylphenols. Among them are the commercially significant phosphites, tris(nonylphenyl)phosphite (TNPP) and tris(2,4-di-t-butylphenyl)phosphite. Historically, TNPP has been the primary low cost liquid phosphite stabilizer used in the plastic and rubber industry. Recently, however, plastic and rubber manufactures have been reluctant to use TNPP in their formulation due to concerns that one of the degradation product of TNPP (nonylphenol) may be xenoestrogen.

U.S. Pat. No. 6,541,549 B2 and U.S. Pat. No. 7,199,170 B2 disclose phosphite compounds having a general Structure I as non-xenoestrogenic stabilizers for polymers, although they are still based on an alkylphenol.

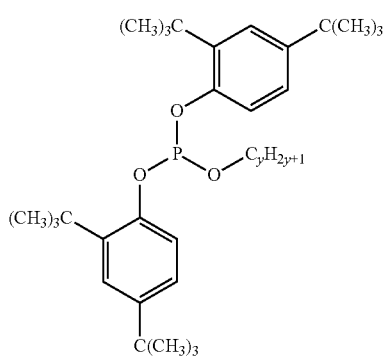

Structure I

U.S. Pat. No. 7,186,853 B2 discloses phosphites comprising substituted or unsubstituted tricyclodecylmethyl groups. The phosphites disclosed also comprise certain alcohols which can be aliphatic, arylalkyl and alkylaryl.

U.S. Pat. No. 7,468,410 B2 and WO 07 009,916 disclose tris-(mono-alkyl)phenyl phosphites or a mixture of the general Structure II where each R is the same or different alkyl group having 1 to 8 carbon atoms. Again this is a low molecular weight monophosphite still based on an alkylphenol.

The problem with the mono phosphites or lower molecular weight phosphites described in the mentioned patents are that, the phosphites are still based on an alkylphenol of some type and lower molecular weight phosphites can be extracted easily from the polymer. Alkylphenols are of concern as potential skin irritants or having xenoestrogenic activity. Being easily extracted from a polymer means the phosphite or its degradation products can easily migrate into foods that come into contact with polymer that maybe stabilized with the lower molecular weight or mono phosphites.

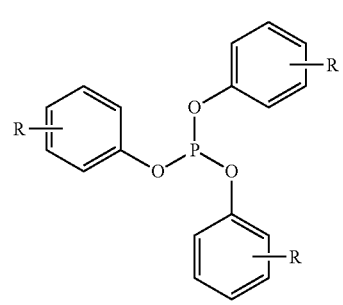

Structure II

WO 08 028,858 discloses liquid polymeric phosphites of the general structure III wherein L is a linkage between the repeated unit n, comprising $C_1$-$C_{24}$ alkylene, $C_2$-$C_{24}$ alkenylene, and oxygen, sulfur or substituted nitrogen (N—R) interrupted $C_2$-$C_{24}$ alkenylene. The integer m is 0 and 1.

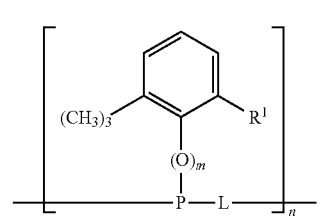

Structure III

A disadvantage of the polymeric phosphites of this disclosure is that all the polymeric phosphites are based on an alkylphenol of some type. It is preferable to have a polymeric phosphite that does not contain an alkylphenol.

SUMMARY OF THE INVENTION

The present invention is directed to novel liquid polymeric phosphites of the general Structure IV as stabilizers for polymers during processing.

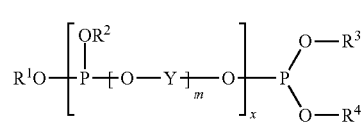

Structure IV wherein
each $R^1$, $R^2$, $R^3$ and $R^4$ can be the same or different and independently selected from the group consisting of $C_{1-20}$ alkyl, $C_{3-22}$ alkenyl, $C_{6-40}$ cycloalkyl, $C_{7-40}$ cycloalkylene, $C_{1-20}$ methoxy alkyl glycol ethers, $C_{1-20}$ alkyl glycol ethers, and or Y—OH (serving as an end capping moiety)

Y is selected from the group consisting of $C_{2-40}$ alkylene, $C_{2-40}$ alkyl lactone, (e.g., ethylene, propylene, caprylactone), $-R^7-N(R^8)-R^9-$ (e.g., $C_{2-40}$ alkyl diamines and $C_{2-40}$ alkyl triamines),
wherein $R^7$, $R^8$ and $R^9$ are independently selected from the group previously defined for $R^1$, $R^2$, $R^3$ and $R^4$, now further including H;
m is an integral value ranging from 2 to 100 inclusive; and
x is an integral value ranging from 1 to 1,000.

Depending on reaction conditions and components, it is also possible to synthesize Structure V, and be within the scope of this invention:

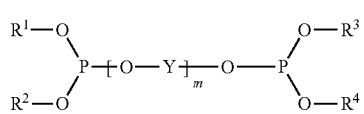

Structure V wherein
each $R^1$, $R^2$, $R^3$ and $R^4$ are as defined previously;
Y is as defined previously; and
m is as defined previously.

The novel, polymeric phosphites of the general Structures IV or V are suitable for stabilization of organic materials against oxidative, thermal or actinic degradation.

The most preferred polymeric diphosphites or polymeric phosphites are the ones that do not have or contain aromatic groups or alkylphenol groups.

The advantages of the liquid high molecule weight dimeric and the polymeric phosphites are very low volatility, no migration out of the polymer being stabilized, very difficult to extract from the polymer being stabilized. These advantages can translate into no plate out during polymer extrusion (no die lip build up) and no migration into food from polymers that are used in food packaging. It is extremely advantageous to have a liquid polymeric phosphite that has excellent hydrolytic stability and one that is not based on alkylphenols.

These and other objects of this invention will be evident when viewed in light of the drawings, detailed description and appended claims.

DETAILED DESCRIPTION OF THE INVENTION

The best mode for carrying out the invention will now be described for the purposes of illustrating the best mode known to the applicant at the time of the filing of this invention. The examples and figures are illustrative only and not meant to limit the invention, as measured by the scope and spirit of the claims.

As used herein, and unless otherwise stated, the term "alkyl" means straight and branched chain saturated acyclic hydrocarbon monovalent groups; said alkyl group may further optionally include one or more suitable substituents independently selected from the group consisting of amino, halogen, hydroxy, sulfhydryl, haloalkyl, alkoxy and the like. Specific non-limiting examples of straight-chain or branched alkyl groups are $C_{1-20}$ alkyls, e.g., methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl and stearyl groups. It is recognized that the alkyl may be interrupted with oxygen, sulfur or nitrogen, examples for which include: $CH_3-O-CH_2CH_2-$, $CH_3-S-CH_2CH_2-$, $CH_3-N(CH_3)-CH_2CH_2-$, $CH_3-O-CH_2-O-CH_2CH_2-$, $CH_3-(O-CH_2CH_2-)_2O-CH_2CH_2-$, $CH_3-(O-CH_2CH_2-)_3O-CH_2CH_2-$ or $CH_3-(O-CH_2CH_2-)_4O-CH_2CH_2-$.

As used herein, and unless otherwise stated, the term "alkenyl" means straight and branched chain unsaturated acyclic hydrocarbon monovalent groups; said alkenyl group may further optionally include one or more suitable substituents independently selected from the group consisting of amino, halogen, hydroxy, sulfhydryl, haloalkyl, alkoxy and the like. Specific non-limiting examples of the straight-chain or branched alkenyl groups are those having 2 to 30 carbon atoms wherein the position of the double bond may vary, such as butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, and octadecenyl groups. It is once again, recognized that the alkenyl may be interrupted with oxygen, sulfur or nitrogen, examples for which include: $-CH_2-O-CH_2-$, $-CH_2-S-CH_2-$, $-CH_2-N(CH_3)-CH_2-$, $-CH_2-O-CH_2CH_2-$, $-CH_2CH_2-O-CH_2CH_2-$, $-CH_2CH_2-O-CH_2CH_2-O-CH_2CH_2-$, $-CH_2CH_2-(O-CH_2CH_2-)_2O-CH_2CH_2-$, $-CH_2CH_2-(O-CH_2CH_2-)_3O-CH_2CH_2-$, $-CH_2CH_2-(O-CH_2CH_2-)_4O-CH_2CH_2-$, $-CH_2CH_2-S-CH_2CH_2-$ or $-CH_2CH_2-N(CH_3)-CH_2CH_2-$.

As used herein, and unless otherwise stated, the terms "cycloaliphatic" refer to a mono- or polycyclic saturated hydrocarbon monovalent group having from 3 to 10 carbon atoms, or a $C_{7-10}$ polycyclic saturated hydrocarbon monovalent group having from 7 to 10 carbon atoms. Specific non-limiting examples of the cycloaliphatic or cyclic alkyl groups which may have substituents are cycloalkyl groups having 5 to 7 carbon atoms such as cyclopentyl, cyclohexyl and cycloheptyl groups, and the alkylcycloalkyl groups having 6 to 11 carbon atoms wherein the position of the alkyl group may vary, such as methylcyclopentyl, dimethylcyclopentyl, methylethylcyclopentyl, dimethylcyclopentyl, methylcyclohexyl, dimethylcyclohexyl, methylethylcyclohexyl, diethylcyclohexyl, methylcycloheptyl, dimethylcycloheptyl, methylcycloheptyl, and diethylcycloheptyl groups. It is once again, recognized that the cycloaliphatic may be interrupted with oxygen, sulfur or nitrogen.

As used herein, and unless otherwise stated, the term "heterocyclic" means a mono- or polycyclic, saturated or mono-unsaturated or poly-unsaturated monovalent hydrocarbon group having from 2 up to 15 carbon atoms and including one or more heteroatoms in one or more rings, each of said rings having from 3 to 10 atoms (and optionally further including one or more heteroatoms attached to one or more carbon atoms of said ring, for instance in the form of a carbonyl or thiocarbonyl or selenocarbonyl group, and/or to one or more heteroatoms of said ring, each of said heteroatoms being independently selected from the group consisting of nitrogen, oxygen, sulfur, selenium and phosphorus, heterocyclic groups, including all possible isomeric forms thereof, wherein each carbon atom of said heterocyclic ring may be independently substituted with a substituent selected from the group consisting of halogen, nitro, $C_{1-7}$ alkyl (such as above defined, in particular methyl), $C_{3-7}$ alkenyl, trifluoromethyl, $C_{3-10}$ cycloalkyl, hydroxyl, sulfhydryl, $C_{1-7}$ alkoxy (such as above defined, in particular methoxy), thio $C_{1-7}$ alkyl, thio $C_{3-10}$ cycloalkyl, cyano, carboxylic acid or esters. depending upon the number of unsaturations in each of said rings, heterocyclic groups may be sub-divided into heteroaromatic (or "heteroaryl") groups and non-aromatic heterocyclic groups; when a heteroatom of the said non-aromatic heterocyclic group is nitrogen, the latter may be substituted with a substituent selected from the group consisting of $C_{1-7}$ alkyl, $C_{3-10}$ cycloalkyl, aryl, arylalkyl and alkylaryl (each of said groups being as defined herein).

As used herein, and unless otherwise stated, the term "alkoxy" refer to substituents wherein an alkyl group is attached to an oxygen atom through a single bond.

As used herein, and unless otherwise stated, the terms "halo" or "halogen" means any atom selected from the group consisting of fluoro, chloro, bromo and iodo.

As used herein, and unless otherwise stated, the term "acyl" refers to a substituent derived from an acid such as an organic monocarboxylic acid, a carbonic acid, a carbamic acid (resulting into a carbamoyl substituent) or the thioacid or imidic acid (resulting into a carbamidoyl substituent) corresponding to said acids, wherein said acids comprise an aliphatic, aromatic or heterocyclic group in the molecule. A more specific kind of "acyl" group within the scope of the above definition refers to a carbonyl (oxo) group adjacent to an alkyl, a cycloalkyl, an aryl, an arylalkyl or a heterocyclic group, all of them being such as herein defined.

The present invention is directed to novel liquid polymeric phosphites of the general Structure IV as stabilizers for polymers during processing.

Structure IV

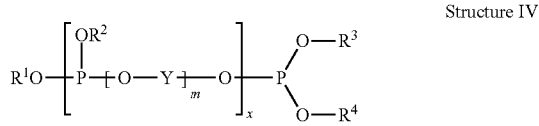

wherein
each $R^1$, $R^2$, $R^3$ and $R^4$ can be the same or different and independently selected from the group consisting of $C_{1-20}$ alkyl, $C_{3-22}$ alkenyl, $C_{6-40}$ cycloalkyl, $C_{7-40}$ cycloalkylene, $C_{1-20}$ methoxy alkyl glycol ethers, $C_{1-20}$ alkyl glycol ethers, and or Y—OH (serving as an end capping moiety);
Y is selected from the group consisting of $C_{2-40}$ alkylene, $C_{2-40}$ alkyl lactone, (e.g., ethylene, propylene, caprylactone), —$R^7$—N($R^8$)—$R^9$— (e.g., $C_{2-40}$ alkyl diamines and $C_{2-40}$ alkyl triamines),
wherein $R^7$, $R^8$ and $R^9$ are independently selected from the group previously defined for $R^1$, $R^2$, $R^3$ and $R^4$, now further including H;
m is an integral value ranging from 2 to 100 inclusive; and
x is an integral value ranging from 1 to 1,000.

Depending on reaction conditions and components, it is also possible to synthesize Structure V, and be within the scope of this invention:

Structure V

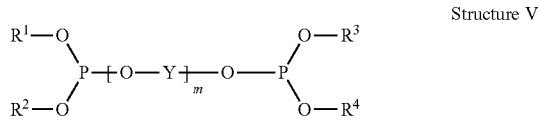

wherein
each $R^1$, $R^2$, $R^3$ and $R^4$ are as defined previously;
Y is as defined previously; and
m is as defined previously.

Synthesis of the compositions typically involve transesterification in which triphenyl phosphite (or any other suitable alkyl or aryl phosphite) is allowed to react with an alkyl or alkenyl alcohol or polyethylene or polypropylene glycol-ether and a diol or a polymeric diol $H(OY)_mOH$ wherein Y and m are as previously defined with a suitable base catalyst at temperature between 20° C. and 250° C., and more preferred at temperature between 50° C. and 185° C. Non-limiting examples of mono alkyl or alkenyl alcohols include: decyl, isodecyl, lauryl, tridecyl, isotridecyl, myristyl, pentdecyl, palmyl, stearyl, isotearyl, oleic alcohol, momo hydroxyl glcolethers, etc.

Suitable base catalysts include sodium hydroxide, sodium methoxide, sodium phenolate, potassium hydroxide, and potassium carbonate. The amount of the base catalyst used is within the range of 0.01 to 10 weight percent based on the total amount of reactants charged. In a preferred embodiment, the amounts are within 0.1 to 1.0 weight percent of the reactants.

The mole ratio of alkyl alcohol or glycol-ether (containing no alkylphenols) and a polymeric diol used in forming the diphosphite of general Structures IV or V, with regard to triphenyl phosphite, is from about 1.9 to 2.2 moles of the phenol or alcohol or glycol-ether per mole of triphenyl phosphite and 0.3 to 0.6 mole of the diol per mole of triphenyl phosphite. In a preferred embodiment, the mole ratio is 2.0 to 1.0 of an alkyl or alkenyl alcohol or a glycol ether per mole of triphenyl phosphite and the mole ratio of a diol to triphenyl phosphite is 0.5 to 1.0.

The structure composition of the polymeric phosphites of the Structure IV depends on the reaction conditions, for example the temperature, the sequence how the reactants are added, alkyl or alkenyl alcohol or glycol ether or a mixture or alkyl or alkenyl alcohol or glycol ether or a combination of some or all are used, the mole ratio and the concentration of the alkyl or alkenyl alcohols or glycol ether and the polymeric diols, and the molecular weight of the polymeric diols chosen. For example, the phosphorus content of the polymeric phosphite can be adjusted by the molecular weight of the diol and the alkyl or alkenyl alcohol or glycol ether chosen. The viscosity of the polyphosphite, again, can be adjusted by the molecular weight, the length and the structure, whether it is straight or branched, of the diol used, and as well as the molecular weight of the phenol alkyl or alkenyl alcohol or glycol ether used.

The preferred alkyl alcohols used are $C_{12}$ to $C_{18}$. The preferred alkenyl alcohols used are the $C_{16}$ and $C_{18}$. And the preferred glycol ethers used are Carbowax 350 (monomethylether of polyethylene glycol MW 350, and tripropylene glycol monobutylether.

The polymeric diols used in the process are those which are commercially available, known as poly glycols. The preferred poly glycols are polyethylene or polypropylene glycols, having molecular weight ranging from 200 to 3000, and existing as liquids at room temperature. The most preferred are polyethylene glycols, having molecular weight 300 to 400, and polypropylene glycols, having molecular weight of 300 to 1000.

The polymeric diphosphites of the general Structure IV and the polymeric phosphites of general Structure V are suitable for stabilization of organic materials against oxidative, thermal or actinic degradation.

The organic materials are preferably synthetic polymers. Non-limiting illustrative examples of such polymers include:

Polymers of monoolefins and diolefins for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE) and blends of the polymers described above, regardless of the method of preparation.

Mixtures of the polymers above, for example, mixtures of polypropylene with polyisobutylene, polypropylene with polyethylene (for example PP/HDPE, PP/LDPE) and mixtures of different types of polyethylene (for example LDPE/HDPE).

Copolymers of monoolefins and diolefins with each other or with other vinyl monomers such as ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned previously, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

Hydrocarbon resins, (for example $C_5$-$C_9$) including hydrogenated modifications thereof (e.g. tackifiers) and mixtures of polyalkylenes and starch.

Homopolymers and copolymers from the above and which may have any stereostructure including syndiotactic, isotactic, hemi-isotactic or atactic. Stereoblock polymers are also included.

Polystyrene and poly(p-methylstyrene) and poly($\alpha$-methylstyene).

Aromatic homopolymers and copolymers derived from vinyl aromatic monomers including styrene, $\alpha$-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic. Stereoblock polymers are also included. Copolymers are included, such as vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene. Hydrogenated aromatic polymers derived from hydrogenation of polymers mentioned above are included, especially including polycyclohexylethylene (PCHE) prepared by hydrogenating atactic polystyrene, often referred to as polyvinylcyclohexane (PVCH). Further included are hydrogenated aromatic polymers derived from hydrogenation of polymers mentioned previously. The homopolymers and copolymers may have any stereostructure including syndiotactic, isotactic, hemi-isotactic or atactic. Stereoblock polymers are also included.

Graft copolymers of vinyl aromatic monomers, such as styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed above, for example the copolymer mixtures known as ABS, MBS, ASA or AES polymers.

Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers. such as styrene on polybutadiene, styrene and alkylacrylates or methacrylates on butadiene, styrene and acrylonitrile on ethylene/propylene/diene terpolymers, styrene and acrylonitrile on polyacrylates or polymethacrylates, styrene and acrylonitrile on acrylate/butadiene copolymers, and copolymer blends known as ABS, MBS, and AES polymers.

Polymers derived from $\alpha,\beta$-unsaturated acids and derivatives thereof such as polyacrylates and polymethacrylates; polymethyl methacrylates, polyacrylamides and polyacrylonitriles, impact-modified with butyl acrylate.

Copolymers of the monomers mentioned in the preceding paragraph with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned above.

Homopolymers and copolymers of cyclic ethers such as polyalkylene glycols, polyethylene oxide, polypropylene oxide or copolymers thereof with bisglycidyl ethers.

Polyacetals such as polyoxymethylene and those polyoxymethylenes which contain ethylene oxide as a comonomer; polyacetals modified with thermoplastic polyurethanes, acrylates or MBS.

Polyphenylene oxides and sulfides, and mixtures of polyphenylene oxides with styrene polymers or polyamides.

Polyurethanes derived from hydroxyl-terminated polyethers, polyesters or polybutadienes on the one hand and aliphatic or aromatic polyisocyanates on the other, as well as precursors thereof.

Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

Polyureas, polyimides, polyamide-imides, polyetherimids, polyesterimids, polyhydantoins and polybenzimidazoles.

Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

Polycarbonates and polyester carbonates.

Polysulfones, polyether sulfones and polyether ketones.

Crosslinked polymers derived from aldehydes on the one hand and phenols, ureas and melamines on the other hand, such as phenol/formaldehyde resins, urea/formaldehyde resins and melamine/formaldehyde resins.

Drying and non-drying alkyd resins.

Unsaturated polyester resins derived from copolyesters of saturated and unsaturated dicarboxylic acids with polyhydric alcohols and vinyl compounds as crosslinking agents, and also halogen-containing modifications thereof of low flammability.

Crosslinkable acrylic resins derived from substituted acrylates, for example epoxy acrylates, urethane acrylates or polyester acrylates.

Alkyd resins, polyester resins and acrylate resins crosslinked with melamine resins, urea resins, isocyanates, isocyanurates, polyisocyanates or epoxy resins.

Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

Blends and alloys of the aforementioned polymers (polyblends), for example PP/EPDM, Polyamide/EPDM or ABS, PVC/EVA, PVC/ABS, PVC/MBS, PC/ABS, PC/Polyester, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

Aqueous emulsions of natural or synthetic rubber, e.g. natural latex or latices of carboxylated styrene/butadiene copolymers.

In general the polymeric diphosphites and the polymeric phosphites of this invention are added to the organic material to be stabilized in amounts from about 0.001 wt % to about 5 wt % of the weight of the organic material to be stabilized. A more preferred range is from about 0.01% to 2.0%. The most preferred range is from 0.025% to 1%.

The stabilizers of this invention may be incorporated into the organic materials at any convenient stage prior to manufacture of the shaped article using techniques known in the art.

The stabilized polymer compositions of the invention may also contain from about 0.001% to 5%, preferably from 0.01% to 2%, and most preferably from 0.025% to 1% of other conventional stabilizers, a non-limiting exemplary list is provided below.

Hindered phenolic antioxidants such as 2,6-di-tert-butyl-4-methylphenol; octadecyl 3,5-di-tert-butyl-4-hydroxy-hydrocinnamate; tetrakis methylene (3,5-di-tert-butyl-4-hydroxyhydrocinnamate)methane; and tris(3,5-di-tert-butyl-4-hydroxybenzyl)isocyanate.

Thioesters, a non-limiting exemplary list including dilauryl thiodipropionate and distearyl thiodipropionate.

Aromatic amine stabilizers, a non-limiting exemplary list including as N,N'-diphenyl-p-phenylene-diamine.

Hindered amine light stabilizers, known as HALS, a non-limiting exemplary list including bis-(2,2,6,6-tetramethylpiperidyl)sebacate, condensation product of N,N'-(2,2,6,6-tetramethylpiperidyl)-hexamethylenediamine and 4,4-octylamino-2,6-dichloro-s-triazine, and the condensation product of N,N'-(2,2,6,6-tetramethylpiperidyl)-hexamethylenediamine and 4-N-morpholinyl-2,6-dichloro-s-triazine.

UV absorbers, a non-limiting exemplary list including 2-hydroxy-4-n-octyloxybenzophenone, 2(2'-hydroxy-5'-methylphenyl)-benzotriazole, and 2(2'-hydroxy-5-t-octylphenyl)-benzotriazole.

Phosphites, a non-limiting exemplary list including tris(2,4-di-tert-butylphenyl)phosphite, distearyl pentaerythritol diphosphite, and 2,4-dicumylphenyl pentaerythritol diphosphite.

Acid neutralizers, a non-limiting exemplary list including calcium stearate, zinc stearate, calcium lactate, calcium stearyl lactate, epoxidized soybean oil, and hydrotalcite (natural and synthetic).

Other additives such as lubricants, antistatic agents, antiblocking agents, slip agents, fire retardants, nucleating agents, impact modifiers, blowing agents, plasticizers, fillers, dyes, and pigments may be used in an amount appropriate and in combination of the invented polymeric diphosphites to modify a selected property of the polymer, such as alkanolamines, a non-limiting exemplary list including triethanolamine and triisopropanolamine.

The novel, polymeric phosphites of the structures IV and V can be used in particular with combination of phenolic antioxidants, light stabilizers and/or processing stabilizers.

In addition to the liquid polymeric compounds of the formulas IV and V, the novel compositions can comprise further additives, such as for example the following:

Antioxidants:

Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'yl)phenol, 2,4-dimethyl-6-(1'-methyltridec-1'-yl)phenol and mixtures thereof.

Alkylthiomethylphenols, for example 2,4-dioctylthiomethyl-6-tert-butylphenol, 2,4-dioctyl-thiomethyl-6-methylphenol, 2,4-dioctylthiomethyl-6-ethylphenol, 2,6-di-dodecylthiomethyl-4-nonylphenol.

Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octade-cyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

Tocopherols, for example α-tocopherol, β-tocopherol, γ-tocopherol, δ-tocopherol and mixtures thereof (vitamin E).

Hydroxylated thiodiphenyl ethers, for example 2,2'-thiobis (6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis [6-(α-methylbenzyI)-4-nonylphenol], 2,2'-methylenebis[6-(α,α-dimethylbenzyI)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra(5-tert-butyl-4-hydroxy-2-methylphenyl)pentane.

O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

Aromatic hydroxybenzyl compounds, for example 1,3,5-tris(3,5-di-tert-butyl-4-hydroxy-benzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

Triazine compounds, for example 2,4-bis(octylmercapto)-6-(3,5-di-tert-butyl-4-hydroxy-anilino)-1,3,5-triazine, 2-octylmercapto-4,6-bis(3,5-di-tert-butyl-4-hydroxyanilino)-1, 3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzypisocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

Benzylphosphonates, for example dim ethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

Acylaminophenols, for example 4-hydroxylauranilide, 4-hydroxystearanilide, octyl N-(3,5-di-tert-butyl-4-hydroxyphenyl)carbamate.

Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

Amides of β-(3,5-di-tert-butyl-4-hydroxyphenyl)propionic acid e.g. N,N'-bis(3,5-di-tert-butyl-4-hydroxyphenyl-propionyl)hexamethylenediamide, N,N'-bis(3,5-di-tert-butyl-4-hydroxy-phenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide.

Ascorbic acid (vitamin C).

Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

UV absorbers and light stabilizers 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; —[R—CH$_2$CH$_2$—COO—CH$_2$CH$_2$]$_2$—, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole.

2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl, 3,5-di-tert-butyl-4-hydroxybenzoate, hexadecyl-3,5-di-tert-butyl-4-hydroxybenzoate, octadecyl-3,5-di-tert-butyl-4-hydroxybenzoate, 2-methyl-4,6-di-tert-butylphenyl-3,5-di-tert-butyl-4-hydroxybenzoate.

Acrylates, for example ethyl α-cyano-β,β-diphenylacrylate, isooctyl-α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy β-cyanovinyl)-2-methylindoline.

Nickel compounds, for example nickel complexes of 2,2'-thiobis[4-(1,1,3,3-tetramethyl-butyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethyl-piperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylene diamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine, a condensate of 1,6-hexanediamine and 2,4,6-trichloro-1,3,5-triazine as well as N,N-dibutylamine and 4-butylamino-2,2,6,6-tetramethylpiperidine, N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-di-aza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bisformyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2-[2-hydroxy-4-(2-ethylethoxy)phenyl]-4,6-diphenyl-1,3,5-triazine.

Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyldihydrazide, N,N'-bis(salicyloyl)thiopropionyl dihydrazide.

Phosphites and phosphonites, for example triphenyl phosphite, diphenylalkyl phosphites, phenyldialkyl phosphites, tris(nonylphenyl)phosphite, trilauryl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo[triethyltris(3,3',5,5'-tetra-tert-butyl-1,r-bi[rho]henyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

Phosphines, for example 1,3-bis(diphenylphosphino)-2,2-dimethyl-propane.

Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

Nitrones, for example N-benzyl-α-phenylnitrone, N-ethyl-α-methylnitrone, N-octyl-α-heptylnitrone, N-lauryl-α-undecylnitrone, N-tetradecyl-α-tridecylnitrone, N-hexadecyl-α-pentadecylnitrone, N-octadecyl-α-heptadecylnitrone, N-hexadecyl-α-heptadecylnitrone, N-ocatadecyl-α-pentadecylnitrone, N-heptadecyl-α-hepta-decylnitrone, N-octadecyl-α-hexadecylnitrone, nitrone derived from N,N-dialkylhydroxylamine derived from hydrogenated tallow amine.

Thiosynemists, for example dilauryl thiodipropionate or distearyl thiodipropionate.

Peroxide scavengers, for example esters of p-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis((3-dodecylmercapto)propionate.

Polvamide stabilizers, for example copper salts in combination with iodides and/or phosphorus compounds and salts of divalent manganese.

Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers), e.g., 1,3:2,4-bis(3',4'-dimethylbenzylidene)sorbitol, 1,3:2,4-di(paramethyldibenzylidene)sorbitol, and 1,3:2,4-di(benzylidene)sorbitol.

Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

Other additives, for example plasticizers, lubricants, emulsifiers, pigments, rheology additives, catalysts, flow-control agents, optical brighteners, flameproofing agents, antistatic agents blowing agents and infrared (IR) adsorbers. Preferred IR absorbers are for example pigments, dyes or organometallic compounds.

Benzofuranones and indolinones, such as 3-[4-(2-acetoxyethoxy)phenyl]-5,7-di-tert-butylbenzofuran-2-one, 5,7-di-tert-butyl-3-[4-(2-stearoyl-oxyethoxy)phenyl]benzofuran-2-one, 3,3'-bis[5,7-di-tert-butyl-3-(4-[2-hydroxyethoxy]phenyl)-benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one or 3-(2-acetyl-5-isooctylphenyl)-5-isooctylbenzofuran-2-one.

The synthetic polymers prepared in this way can be employed in a wide variety of forms, for example as foams, films, fibers, tapes, molding compositions, as profiles or as binders for coating materials, especially powder coatings, adhesives, putties or especially as thick-layer polyolefin moldings which are in long-term contact with extractive media, such as, for example, pipes for liquids or gases, films, fibers, geomembranes, tapes, profiles or tanks.

In one non-limiting embodiment, the preferred thick-layer polyolefin moldings have a layer thickness of from 1 to 50 mm, in particular from 1 to 30 mm, for example from 2 to 10 mm.

The compositions according to the invention can be advantageously used for the preparation of various shaped articles. An exemplary non-limiting list of end-use applications include, but are not limited to: Floating devices, marine applications, pontoons, buoys, plastic lumber for decks, piers, boats, kayaks, oars, and beach reinforcements; Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side moldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof; Road traffic devices, in particular sign postings, posts for road marking, car accessories, warning triangles, medical cases, helmets, tires; Devices for plane, railway, motor car (car, motorbike) including furnishings; Devices for space applications, in particular rockets and satellites, e.g. reentry shields; Devices for architecture and design, mining applications, acoustic quietized systems, street refuges, and shelters.

The invention also has applicability in: Appliances, cases and coverings in general and electric/electronic devices (personal computer, telephone, portable phone, printer, television-sets, audio and video devices), flower pots, satellite TV bowl, and panel devices; Jacketing for other materials such as steel or textiles; Devices for the electronic industry, in particular insulation for plugs, especially computer plugs, cases for electric and electronic parts, printed boards, and materials for electronic data storage such as chips, check cards or credit cards; Electric appliances, in particular washing machines, tumblers, ovens (microwave oven), dish-washers, mixers, and irons; Covers for lights (e.g. street-lights, lamp-shades); Applications in wire and cable (semi-conductor, insulation and cable-jacketing); and foils for condensers, refrigerators, heating devices, air conditioners, encapsulating of electronics, semi-conductors, coffee machines, and vacuum cleaners.

The invention further has applicability in: Technical articles such as cogwheel (gear), slide fittings, spacers, screws, bolts, handles, and knobs; Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves, and conveyor belts; Sanitary articles, in particular shower cubicles, lavatory seats, covers, and sinks; Hygienic articles, in particular diapers (babies, adult incontinence), feminine hygiene articles, shower curtains, brushes, mats, tubs, mobile toilets, tooth brushes, and bed pans; Pipes (crosslinked or not) for water, waste water and chemicals, pipes for wire and cable protection, pipes for gas, oil and sewage, guttering, down pipes, and drainage systems; Profiles of any geometry (window panes) and siding; Glass substitutes, in particular extruded or co-extruded plates, glazing for buildings (monolithic, twin or multiwall), aircraft, schools, extruded sheets, window film for architectural glazing, train, transportation, sanitary articles, and greenhouse; Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles; Intake and outlet manifolds; and Cement-, concrete-, composite-applications and covers, siding and cladding, hand rails, banisters, kitchen work tops, roofing, roofing sheets, tiles, and tarpaulins.

Still further applications include: Plates (walls and cutting board), trays, artificial grass, astroturf, artificial covering for stadium rings (athletics), artificial floor for stadium rings (athletics), and tapes; Woven fabrics continuous and staple, fibers (carpets/hygienic articles/geotextiles/monofilaments; filters; wipes/curtains (shades)/medical applications), bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags; and Membranes, insulation, covers and seals for roofs, tunnels, dumps, ponds, dumps, walls roofing membranes, geomembranes, swimming pools, curtains (shades)/sun-shields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

Additional applications include: Films (packaging, dump, laminating, agriculture and horticulture, greenhouse, mulch, tunnel, silage), bale wrap, swimming pools, waste bags, wallpaper, stretch film, raffia, desalination film, batteries, and connectors; Food packing and wrapping (flexible and solid), bottles; Storage systems such as boxes (crates), luggage, chest, household boxes, pallets, shelves, tracks, screw boxes, packs, and cans; and Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

Still additional applications may encompass: Extrusion coating (photo paper, tetrapack, pipe coating), household articles of any kind (e.g. appliances, thermos bottle/clothes hanger), fastening systems such as plugs, wire and cable clamps, zippers, closures, locks, and snap-closures; Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans; Furniture in general, foamed articles (cushions, impact absorbers), foams, sponges, dish clothes, mats, garden chairs, stadium seats, tables, couches, toys, building kits (boards/figures/balls), playhouses, slides, and play vehicles; Materials for optical and magnetic data storage; Kitchen ware (eating, drinking, cooking, storing); Boxes for CD's, cassettes and video tapes; DVD electronic articles, office supplies of any kind (ballpoint pens, stamps and ink-pads, mouse, shelves, tracks), bottles of any volume and content (drinks, detergents, cosmetics including perfumes), and adhesive tapes; Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies; and devices of filled polymers (talc, chalk, china clay (kaolin), wollastonite, pigments, carbon black, TiO2, mica, nanocomposites, dolomite, silicates, glass, asbestos).

Still further applications may encompass are: compositions comprising as component (a) fibers and fabrics used in nonwoven medical fabric and related apparel (surgical gowns, drapes, bandages), construction fabrics (house wrapping, roofing, swimming-pool wrapping) and home furnishing (carpets, table linens, shower curtains).

Thus, a further embodiment of the present invention relates to a shaped article, in particular a film, pipe, profile, bottle, tank or container, fiber containing a composition as described above.

As evident from the above, the organic materials to be protected are preferably organic polymers, particularly synthetic polymers. Thermoplastic materials, in particular polyolefins, are particularly advantageously protected. In particular, the excellent effectiveness of the polymeric compounds of the formula IV as processing stabilizers (heat stabilizers) should be emphasized. For this purpose, they are advantageously added to the polymer before or during processing thereof. However, other polymers (for example elastomers) or lubricants or hydraulic fluids can also be stabilized against degradation, for example light-induced or thermo-oxidative degradation. Elastomers are given in the above list of possible organic materials.

At least one aspect of the present invention is therefore the use of a liquid polymeric compound of the Formula IV or Formula V or a mixture of compositions resulting from the synthesis of compositions covered by Formulas IV and/or V for protecting organic materials against oxidative, thermal or light-induced degradation. The novel liquid polymeric compounds are at least partially distinguished by pronounced hydrolysis stability and advantageous coloring behaviour, i.e. low discoloration of the organic materials during processing.

The invention will now be described by a series of examples.

EXAMPLES

Example #1

The apparatus in Example #1 was used. PPG 425 (55 g, 0.129 mol), triphenyl phosphite (45 g, 0.145 mol), Carbowax 350 (a mono-methylether polyethylene glycol with an average MW of 350), (63 g, 0.189 mol), and 0.8 grams of potassium hydroxide were added. The mixture was mixed well and heated to 160-162° C. under nitrogen and held at the temperature for 1 hour. The pressure was then gradually reduced to 0.3 mmHg and the temperature was increased to 170-172° C. over a course of 1 hour. The reaction contents were held at 170-172° C. under the vacuum for 2 hours at which point no more phenol was distilling out. The vacuum was then broken by nitrogen and the crude product was cooled to 50° C. The product was a clear, colorless liquid.

Example #2

The apparatus in Example #1 was used. PPG 400 (95 g, 0.237 mol), triphenyl phosphite (73 g, 0.235 mol), a mixture of lauryl and myristyl alcohol with a hydroxyl number of about 280, (47 g, 0.235 mol), and 0.8 grams of potassium hydroxide were added. The mixture was mixed well and heated to 160-162° C. under nitrogen and held at the temperature for 1 hour. The pressure was then gradually reduced to 0.3 mmHg and the temperature was increased to 170-172° C. over a course of 1 hour. The reaction contents were held at 170-172° C. under the vacuum for 2 hours at which point no more phenol was distilling out. The vacuum was then broken by nitrogen and the crude product was cooled to 50° C. The product was a clear, colorless liquid.

Example #3

The apparatus in Example #1 was used. PPG 400 (48 g, 0.12 mol), triphenyl phosphite (73 g, 0.235 mol), lauryl alcohol, (47 g, 0.235 mol), dipropylene glycol (16 g 0.12 mol) and 0.8 grams of potassium hydroxide were added. The mixture was mixed well and heated to 160-162° C. under nitrogen and held at the temperature for 1 hour. The pressure was then gradually reduced to 0.3 mmHg and the temperature was increased to 170-172° C. over a course of 1 hour. The reaction contents were held at 170-172° C. under the vacuum for 2 hours at which point no more phenol was distilling out. The vacuum was then broken by nitrogen and the crude product was cooled to 50° C. The product was a clear, colorless liquid.

Example #4

The apparatus in Example #1 was used. PPG 400 (50.22 g, 0.1256 mol), triphenyl phosphite (40 g, 0.129 mol), Carbowax 350 (a mono-methylether polyethylene glycol with an average MW of 350), (26 g, 0.074 mol), tri-isopropanol amine (4.5 g 0.023 mol), and 0.8 grams of potassium hydroxide were added. The mixture was mixed well and heated to 160-162° C. under nitrogen and held at the temperature for 1 hour. The pressure was then gradually reduced to 0.3 mmHg and the temperature was increased to 170-172° C. over a course of 1 hour. The reaction contents were held at 170-172° C. under the vacuum for 2 hours at which point no more phenol was distilling out. The vacuum was then broken by nitrogen and the crude product was cooled to 50° C. The product was a clear, colorless liquid.

Example #5

The apparatus in Example #1 was used. PPG 400 (100 g, 0.25 mol), triphenyl phosphite (78 g, 0.2516 mol), a mixture of cetyl and stearyl alcohol with a hydroxyl number of about 211, (34 g, 0.1285 mol), tripropylene glycol butylether (32 g, 0.129 mol) and 0.8 grams of potassium carbonate were added. The mixture was mixed well and heated to 160-162° C. under nitrogen and held at the temperature for 1 hour. The pressure was then gradually reduced to 0.3 mmHg and the temperature was increased to 170-172° C. over a course of 1 hour. The reaction contents were held at 170-172° C. under the vacuum for 2 hours at which point no more phenol was distilling out. The vacuum was then broken by nitrogen and the crude product was cooled to 50° C. The product was a clear, colorless liquid.

Example #6

The apparatus in Example #1 was used. PPG 400 (100 g, 0.25 mol), triphenyl phosphite (78 g, 0.2516 mol), a mixture of cetyl and stearyl alcohol with a hydroxyl number of about 211, (34 g, 0.1285 mol), oleyl alcohol (34 g, 0.126 mol) and 0.8 grams of potassium carbonate were added. The mixture was mixed well and heated to 160-162° C. under nitrogen and held at the temperature for 1 hour. The pressure was then gradually reduced to 0.3 mmHg and the temperature was increased to 170-172° C. over a course of 1 hour. The reaction contents were held at 170-172° C. under the vacuum for 2 hours at which point no more phenol was distilling out. The vacuum was then broken by nitrogen and the crude product was cooled to 50° C. The product was a clear, colorless liquid.

Example #7

The apparatus in Example #1 was used. PPG 400 (95 g, 0.237 mol), triphenyl phosphite (73 g, 0.235 mol), Neodol 23 (a blend of $C_{12}$ and $C_{13}$ alcohols) (57 g, 0.266 mol) and 0.8 grams of potassium hydroxide were added. The mixture was mixed well and heated to 160-162° C. under nitrogen and held at the temperature for 1 hour. The pressure was then gradually reduced to 0.3 mmHg and the temperature was increased to 170-172° C. over a course of 1 hour. The reaction contents were held at 170-172° C. under the vacuum for 2 hours at which point no more phenol was distilling out. The vacuum was then broken by nitrogen and the crude product was cooled to 50° C. The product was a hazy, colorless liquid.

Example #8

The apparatus in Example #1 was used. PPG 400 (100 g, 0.25 mol), triphenyl phosphite (155 g, 0.5 mol), a mixture of lauryl and myristyl alcohol with a hydroxyl number of about 280, (200 g, 1.0 mol), and 0.8 grams of potassium hydroxide were added. The mixture was mixed well and heated to 160-162° C. under nitrogen and held at the temperature for 1 hour. The pressure was then gradually reduced to 0.3 mmHg and the temperature was increased to 170-172° C. over a course of 1 hour. The reaction contents were held at 170-172° C. under the vacuum for 2 hours at which point no more phenol was distilling out. The vacuum was then broken by nitrogen and the crude product was cooled to 50° C. The product was a clear, colorless liquid.

Example #9

The apparatus in Example #1 was used. 1,6 hexane diol (57 g, 0.48 mol), triphenyl phosphite (150 g, 0.48 mol), a mixture of lauryl and myristyl alcohol with a hydroxyl number of about 280, (97 g, 0.48 mol), and 0.8 grams of potassium hydroxide were added. The mixture was mixed well and heated to 160-162° C. under nitrogen and held at the temperature for 1 hour. The pressure was then gradually reduced to 0.3 mmHg and the temperature was increased to 170-172° C. over a course of 1 hour. The reaction contents were held at 170-172° C. under the vacuum for 2 hours at which point no more phenol was distilling out. The vacuum was then broken by nitrogen and the crude product was cooled to 50° C. The product was a hazy, colorless liquid.

Example #10

The apparatus in Example #1 was used. Poly THF 250MW (121 g, 0.48 mol), triphenyl phosphite (150 g, 0.48 mol), a mixture of lauryl and myristyl alcohol with a hydroxyl number of about 280, (97 g, 0.48 mol), and 0.8 grams of potassium hydroxide were added. The mixture was mixed well and heated to 160-162° C. under nitrogen and held at the temperature for 1 hour. The pressure was then gradually reduced to 0.3 mmHg and the temperature was increased to 170-172° C. over a course of 1 hour. The reaction contents were held at 170-172° C. under the vacuum for 2 hours at which point no more phenol was distilling out. The vacuum was then broken by nitrogen and the crude product was cooled to 50° C. The product was a hazy, colorless liquid.

Example #11

The apparatus in Example #1 was used. Methyldiethanolamine (58 g, 0.48 mol), triphenyl phosphite (150 g, 0.48 mol), a mixture of lauryl and myristyl alcohol with a hydroxyl number of about 280, (97 g, 0.48 mol), and 0.8 grams of potassium hydroxide were added. The mixture was mixed well and heated to 160-162° C. under nitrogen and held at the temperature for 1 hour. The pressure was then gradually reduced to 0.3 mmHg and the temperature was increased to 170-172° C. over a course of 1 hour. The reaction contents were held at 170-172° C. under the vacuum for 2 hours at which point no more phenol was distilling out. The vacuum was then broken by nitrogen and the crude product was cooled to 50° C. The product was a hazy, colorless liquid.

Characteristics of the various synthesized additives may be characterized at least in part by the following tables.

TABLE 1

| Parameter | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| % P | 3.7 | 4.9 | 5.9 | 4.7 | 4.5 | 4.4 | 4.8 | 4.9 | 8.9 | 6.4 | 6.4 |
| CPS/25° C. | 960 | 3212 | 973 | 2156 | 3144 | 3894 | 642 | 215 | 6528 | 659 | 37282 |
| AV | 0.01 | 0.01 | 0.05 | 0.01 | 0.01 | 0.01 | 0.01 | 0.01 | 0.01 | 0.01 | 0.01 |

TABLE 2

| | MW data | | | | | |
|---|---|---|---|---|---|---|
| Parameter | Ex. 1 | Ex. 2 | Ex. 3 | Ex. 4 | Ex. 5 | Ex. 6 |
| MW range | 1000-16,500 | 700-55,000 | 350-50,000 | 600-16,500 | 1000-55,000 | 800-55,000 |
| Average MW | 6,125 | 9,111 | 7,250 | 6,155 | 21,243 | 10,666 |
| Parameter | Ex. 7 | Ex. 8 | Ex. 9 | Ex. 10 | Ex. 11 | |
| MW range | 1200-55,000 | 630-6,500 | 800-320,000 | 630-16,500 | 850-8,000 | |
| Average MW | 12,024 | 2,550 | 31,515 | 8,157 | 1,530 | |

Polymeric phosphites of examples 1-11 are of great interest because they are not based on alkylphenols.

The following tables detail the performance of some of the polymeric phosphite stabilizers 1-18 in polyolefin's, (linear low density polyethylene, either Exxon or Nova LLDPE was used). These compounds show performance as plastic stabilizers that are comparable to or better than that of TNPP. With regard to Melt Flow Rate (MFR), a good plastic stabilizer will contribute to a low initial MFR and then maintain the low MFR. For Hunter b Color performance, a good plastic stabilizer will yield low initial color and then maintain that low color.

Sample Preparation

The polyolefin powders (polyethylene, LLDPE); (high density polyethyle HDPE) and (polypropylene, PP) are dry blended with the stabilizer formulation using a Warring blender. The mixer is run at approximately 60 rpm or a speed which does not cause the material to splash out of the bowl for 30 seconds with shaking of blender every 5 seconds. The master batch is then added to a preheated co-rotating twin screw extruder where the plastic is homogeneously mixed. Extrusion is typically performed at 260° C. The extruded plastic is cooled into a cold water bath, completely dried, and pelletized. The collected polymer pellets are the result of the first pass extrusion and are the starting material for all subsequent test protocols. The isolated pellets are added to the extruder repeatedly to generate the third and fifth pass material.

Melt Flow Rate Analysis

The melt flow rate was performed using the ASTM 1238-90b test method measured at 21.6 Kg/190° C. The melt flow rate was complete on a Tinius Olsen extrusion plastometer.

Color Analysis

Color analysis was performed on compression molded films or plaques with a Hunter Lab Ulstrascan XE machine. Observations were made with a D65 illuminant and 10° observer. Yellowness Index measurements were made in accord with ASTM D1925-70. The lower the YI (yellowness index) the better the color.

Gas Fade Aging

Gas fade aging was performed based on methods in ASTM 1925 using a NOx gas oven. Analysis was performed on compression molded plaques placed into a 60° C. nitrogen oven. Observations were made by measuring yellowness index for color development during exposure to oxides of nitrogen.

The LLPE formulations were tested using 900 PPM of the phosphite and 500 PPM of the primary antioxidant Dovernox 76 or at 1800 ppm phosphite, 300 ppm Dovernox 76, zinc stearate 200 ppm and 100 ppm DHT4A were used as neutralizers.

The HDPR formulations were tested using 900 ppm phosphite, 500 ppm Dovernox 76 and 500 pp calcium stearate.

The PP formulations were tested using 500 ppm phosphite, 500 ppm Dovernox 10 and 500 ppm calcium stearate.

TABLE 3

LLDPE, MFI
High Load Melt Flow: 190° C./21.6 Kgs (LLDPE, Phosphite at 900 ppm and 500 ppm Dovernox 76, extrusion temperature 260° C.)

| Polymeric Phosphite | $1^{st}$ pass | $3^{rd}$ pass | $5^{th}$ pass |
|---|---|---|---|
| None | 15.3 | 13.6 | 12.8 |
| TNPP | 18.1 | 16.4 | 14.4 |
| Ex 1 | 18.3 | 14.9 | 13.3 |
| Ex. 2 | 18.7 | 17.2 | 15.5 |
| Ex. 4 | 17.1 | 14.4 | 12.9 |
| Ex. 5 | 18.5 | 17.5 | 15.4 |
| Ex. 7 | 18.0 | 16.5 | 14.4 |

The data shows that TNPP gives good MFI stability and so do the polymeric phosphites. The polymeric phosphites either match or in some cases exceed the performance of the TNPP

TABLE 4

LLDPE YI Color Data

| Polymeric Phosphite | $1^{st}$ pass | $3^{rd}$ pass | $5^{th}$ pass |
|---|---|---|---|
| none | −3.7 | −1.7 | 0.4 |
| TNPP | −4.7 | −2.9 | −0.1 |
| Ex. 1 | −6.2 | −3.3 | −1.1 |
| Ex. 2 | −5.4 | −2.9 | 0.0 |
| Ex. 4 | −4.6 | −2.3 | 1.4 |
| Ex. 5 | −4.4 | −2.6 | 0.6 |
| Ex. 7 | −5.3 | −3.9 | −2.2 |

The polymeric phosphites closely match or exceed the performance of the TNPP in color stability (the lower the YI the better the color.

TABLE 5

Gas Fade 60° C. Using 1st Pass, LLDPE, Days

| Phosphite | 0 days | 6 days | 12 days | 19 days | 22 days | 29 days |
|---|---|---|---|---|---|---|
| TNPP | −1.2 | 7.0 | 26.5 | 34.5 | 362 | 39.6 |
| Ex. 2 | −5.4 | 3.8 | 16.8 | 25.1 | 27.4 | 31.8 |
| Ex. 7 | −6.0 | 0.7 | 14.0 | 23.6 | 26.7 | 33.1 |

The gas fade results are better for the polymeric phosphites.

TABLE 6

High Load Melt Flow: 190° C./21.6 Kgs (HDPE: 900 ppm Phosphite, 500 ppm Dovernox 76, and 500 ppm calcium stearate) Extrusion temperature 260° C.

| Phosphite | 1st pass | 3rd pass | 5th pass |
|---|---|---|---|
| none | 25.1 | 22.4 | 20.8 |
| TNPP | 26.6 | 25.3 | 25.1 |
| Ex. 2 | 26.1 | 25.8 | 22.9 |
| Ex. 5 | 25.6 | 24.0 | 22.3 |

TABLE 7

Color, YI for HDPE Extrusion @ 260 C.

| Phosphite | 1st pass | 3rd pass | 5 pass |
|---|---|---|---|
| none | 5 | 9.6 | 12.6 |
| TNPP | 7.4 | 8.1 | 11.7 |
| Ex. 2 | −2.4 | 1.2 | 4.0 |
| Ex. 5 | −1.0 | 1.7 | 4.1 |

The polymeric phosphites show good performance as stabilizer fo HDPE especially for color.

TABLE 8

Melt Flow: 190° C./21.6 Kgs (Polypropylene: 500 ppm Phosphite, 500 ppm Dovernox 10, and 500 ppm calcium stearate) Extrusion temperature 260° C.

| Phosphite | 1st pass | 2nd pass | 3rd pass |
|---|---|---|---|
| none | 30.9 | 50.1 | Too high |
| TNPP | 18.0 | 25.2 | 36.2 |
| Ex. 2 | 20.7 | 26.8 | 39.0 |
| Ex. 5 | 18.9 | 28.2 | 46.9 |
| Ex. 2 using Vitamin E in place of Dovernox 10 | 18.25 | 20.9 | 23.2 |

TABLE 9

Color, YI (Polypropylene: 500 ppm Phosphite, 500 ppm Dovernox 10, and 500 ppm calcium stearate) Extrusion temperature 260° C.

| Phosphite | 1st pass | 2nd pass | 3rd pass |
|---|---|---|---|
| none | 9.8 | 12.9 | 17.6 |
| TNPP | 9 | 13.4 | 16.6 |
| Ex. 2 | 11.6 | 12.3 | 13.5 |
| Ex. 5 | 5.6 | 9.9 | 13.2 |
| Ex. 2 using Vitamin E in place of Dovernox 10 | 10.4 | 14.5 | 18.9 |

The polymeric phosphites show good performance as a stabilizer in PP. The use of Vitamin E as the primary antioxidant in place of the Dovernox 10 greatly improves the MFI.

The data shows that some of the polymeric phosphites perform equal too or better than the TNPP. Besides giving good melt flow stability and color stability during processing and in gas fade testing, the polymeric diphosphite and the polymeric poly-phosphites have excellent compatibility with LLDPE and they do not migrate. Non migration is especial important for additives that are used in polymer film or plastics that are used for food contact. Non migration also reduces of eliminates and plate out on cooling rolls or die build up due to volatile additives. The polymeric poly-phosphites illustrated in Examples 1, 2, 3, 4, 6, 7, and 8 are especially good polymer stabilizers for food contact plastic since they do not contain any alkylphenols and basically are made from raw materials that are all biodegradable.

What has been illustrated is the ability to synthesize a liquid polymeric phosphite in which the substituent groups are essentially all aliphatic. The liquid phosphite is preferably a polyphosphite, in which the segments between the phosphite moieties are preferably a polyalkylene glycol, more preferably a polyethylene or a polypropylene glycol.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. An alkylphenol-free liquid polymeric polyphosphite which comprises:

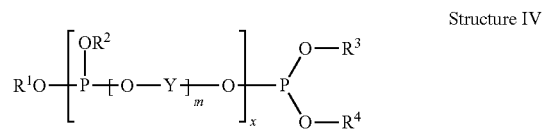

Structure IV wherein
each $R^1$, $R^2$, $R^3$ and $R^4$ can be the same or different and independently selected from the group consisting of $C_{12-20}$ alkyl, $C_{12-22}$ alkenyl, $C_{12-40}$ cycloalkyl, $C_{12-40}$ cycloalkylene, $C_{12-20}$ methoxy alkyl glycol ethers, and Y—OH as an end-capping group;

each Y is independently selected from the group consisting of $C_{1-20}$ alkyl, $C_{6-40}$ cycloalkyl, $C_{7-40}$ cycloalkylene, $C_{3-20}$ alkyl glycol ethers, $C_{2-40}$ alkylene, $C_{3-40}$ alkyl lactone, and —$R^7$—N($R^8$)—$R^9$—;

$R^7$, $R^8$ and $R^9$ are independently selected from the group consisting of $C_{1-20}$ alkyl, $C_{2-22}$ alkenyl, $C_{6-40}$ cycloalkyl, $C_{7-40}$ cycloalkylene and H;

m is an integral value ranging from 2 to 100 inclusive; and x is an integral value ranging from 1 to 1,000, and further wherein said polymeric polyphosphite is a reaction product of:
at least one monohydroxy-terminated reactant selected from the group consisting of $R^1$—OH, $R^2$—OH, $R^3$—OH and $R^4$—OH; and
at least one dihydroxy-terminated reactant selected from the group HO—Y—OH, and a trifunctional reactant comprising at least one phosphorus moiety,
said polymeric polyphosphite having less terminal hydroxy groups than said reaction product formed using dihydroxy-terminated reactants.

2. The polymeric polyphosphite of claim 1 wherein
said polymeric polyphosphite is not based on either an aromatic phenol or an alkylphenol.

3. The polymeric polyphosphite of claim 1 wherein
said polymeric polyphosphite is comprised of a polyalkylene glycol.

4. The polymeric polyphosphite of claim 3 wherein
said polyalkylene glycol is selected from the group consisting of polyethylene glycol and polypropylene glycol.

5. The polymeric polyphosphite of claim 1 wherein
each $R^1$, $R^2$, $R^3$ and $R^4$ are aliphatic, and wherein said polymeric polyphosphite further comprises
an alkanolamine.

6. A process for stabilizing a polymer, as indicated by essentially matching or lowering the Yellowness Index of a polymer when compared to a polymeric composition which does not include the addition of a tris(nonylphenyl) phosphite or the liquid polymeric polyphosphite of formula (IV), comprising the step of adding an alkylphenol-free liquid polymeric polyphosphite which comprises:

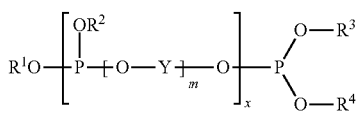

Structure IV wherein
each $R^1$, $R^2$, $R^3$ and $R^4$ can be the same or different and independently selected from the group consisting of $C_{12-20}$ alkyl, $C_{12-22}$ alkenyl, $C_{12-40}$ cycloalkyl, $C_{12-40}$ cycloalkylene, $C_{12-20}$ methoxy alkyl glycol ethers, and Y—OH as an end-capping group;
each Y is independently selected from the group consisting of $C_{1-20}$ alkyl, $C_{6-40}$ cycloalkyl, $C_{7-40}$ cycloalkylene, $C_{3-20}$ alkyl glycol ethers, $C_{2-40}$ alkylene, $C_{3-40}$ alkyl lactone, and —$R^7$—N($R^8$)—$R^9$—;
$R^7$, $R^8$ and $R^9$ are independently selected from the group consisting of $C_{1-20}$ alkyl, $C_{2-22}$ alkenyl, $C_{6-40}$ cycloalkyl, $C_{7-40}$ cycloalkenyl and H;
m is an integral value ranging from 2 to 100 inclusive; and
x is an integral value ranging from 1 to 1,000, and
further wherein said polymeric polyphosphite is a reaction product of:
at least one monohydroxy-terminated reactant selected from the group consisting of $R^1$—OH, $R^2$—OH, $R^3$—OH and $R^4$—OH; and
at least one dihydroxy-terminated reactant selected from the group HO—Y—OH, and
a trifunctional reactant comprising at least one phosphorus moiety,
said polymeric polyphosphite having less terminal hydroxy groups than said reaction product formed using dihydroxy-terminated reactants.

7. The process of claim 6 wherein
said polymeric polyphosphite is not based on either an aromatic phenol or an alkylphenol.

8. The process of claim 6 wherein
said polymeric polyphosphite is comprised of a polyalkylene glycol.

9. The process of claim 8 wherein
said polyalkylene glycol is selected from the group consisting of polyethylene glycol and polypropylene glycol.

10. The process of claim 6 wherein
each $R^1$, $R^2$, $R^3$ and $R^4$ are aliphatic; and wherein said polymeric polyphosphite further comprises
an alkanolamine.

11. The process of claim 6 which comprises:
adding between 0.01-2 weight percent of said polymeric polyphosphite to at least one polymer.

12. The process of claim 11 wherein
said polymer is a carbon-based polymer.

13. The process of claim 11 which further comprises the step of adding at least one other additive selected from the group consisting of
a hindered phenol, a hindered amine light stabilizer, a benzotriazole, a thioester, a second phosphite, a metal stearate and a hydrotalcite.

14. An alkylphenol-free liquid polymeric polyphosphite which comprises:

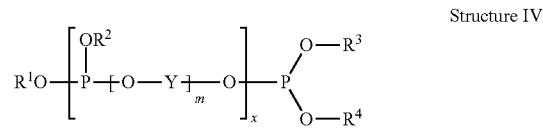

Structure IV wherein
each $R^1$, $R^2$, $R^3$ and $R^4$ can be the same or different and independently selected from the group consisting of $C_{12-20}$ alkyl, $C_{12-22}$ alkenyl, $C_{12-40}$ cycloalkyl, $C_{12-40}$ cycloalkylene, $C_{12-20}$ methoxy alkyl glycol ethers, and Y—OH as an end-capping group;
each Y is independently selected from the group consisting of $C_{1-20}$ alkyl, $C_{6-40}$ cycloalkyl, $C_{7-40}$ cycloalkylene, $C_{2-40}$ alkylene, $C_{3-20}$ alkyl glycol ethers, $C_{3-40}$ alkyl lactone, and —$R^7$—N($R^8$)—$R^9$—;
$R^7$, $R^8$ and $R^9$ are independently selected from the group consisting of $C_{1-20}$ alkyl, $C_{2-22}$ alkenyl, $C_{6-40}$ cycloalkyl, $C_{7-40}$ cycloalkylene, and H;
m is an integral value ranging from 2 to 100 inclusive; and
x is an integral value ranging from 1 to 1,000, and
further wherein said polymeric polyphosphite is a reaction product of:
at least one monohydroxy-terminated reactant selected from the group consisting of $R^1$—OH, $R^2$—OH, $R^3$—OH and $R^4$—OH; and
at least one dihydroxy-terminated reactant selected from the group HO—Y—OH; and
a trifunctional reactant comprising at least one phosphorus moiety,
said polymeric polyphosphite having less terminal hydroxy groups than said reaction product formed using dihydroxy-terminated reactants.

15. The polymeric polyphosphite of claim 14 wherein
said polymeric polyphosphite is not based on either an aromatic phenol or an alkylphenol.

16. The polymeric polyphosphite of claim 14 wherein
said polymeric polyphosphite is comprised of a polyalkylene glycol.

17. The polymeric polyphosphite of claim 16 wherein said polyalkylene glycol is selected from the group consisting of polyethylene glycol and polypropylene glycol.

18. The polymeric polyphosphite of claim 14 wherein each $R^1$, $R^2$, $R^3$ and $R^4$ are aliphatic and wherein said polymeric polyphosphite further comprises an alkanolamine.

19. The polymeric polyphosphite of claim 1 wherein said polymeric polyphosphite has a weight % P ranging from approximately 3.7% to 8.9%.

20. The polymeric polyphosphite of claim 19 wherein said trifunctional reactant comprising at least one phosphorus moiety is aromatic.

21. The polymeric polyphosphite of claim 6 wherein said polymeric polyphosphite has a weight % P ranging from approximately 3.7% to 8.9%.

22. The polymeric polyphosphite of claim 21 wherein said trifunctional reactant comprising at least one phosphorus moiety is aromatic.

23. The polymeric polyphosphite of claim 14 wherein said polymeric polyphosphite has a weight % P ranging from approximately 3.7% to 8.9%.

24. The polymeric polyphosphite of claim 23 wherein said trifunctional reactant comprising at least one phosphorus moiety is aromatic.

25. A process for making an alkylphenol-free liquid polymeric polyphosphite which comprises:

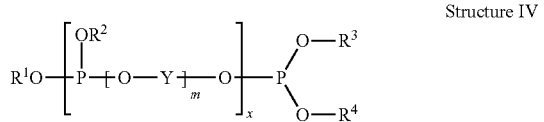

Structure IV wherein
each $R^1$, $R^2$, $R^3$ and $R^4$ can be the same or different and independently selected from the group consisting of $C_{12-20}$ alkyl, $C_{12-22}$ alkenyl, $C_{12-40}$ cycloalkyl, $C_{12-40}$ cycloalkylene, $C_{12-20}$ methoxy alkyl glycol ethers, and Y—OH as an end-capping group;

each Y is independently selected from the group consisting of $C_{1-20}$ alkyl, $C_{6-40}$ cycloalkyl, $C_{7-40}$ cycloalkylene, $C_{2-40}$ alkylene, $C_{3-20}$ alkyl glycol ethers, $C_{3-40}$ alkyl lactone, and —$R^7$—N($R^8$)—$R^9$—;

$R^7$, $R^8$ and $R^9$ are independently selected from the group consisting of $C_{1-20}$ alkyl, $C_{2-22}$ alkenyl, $C_{6-40}$ cycloalkyl, $C_{7-40}$ cycloalkylene, and H;

m is an integral value ranging from 2 to 100 inclusive; and x is an integral value ranging from 1 to 1,000, and further wherein said steps comprise:
adding at least one monohydroxy-terminated reactant selected from the group consisting of $R^1$—OH, $R^2$—OH, $R^3$—OH and $R^4$—OH; and
adding at least one dihydroxy-terminated reactants selected from the group HO—Y—OH; and
adding a trifunctional reactant comprising at least one aromatic phosphorus moiety.

26. The process of claim 25 which further comprises the step of:
adding an alkanolamine.

27. The process of claim 25 which further comprises the step of:
adding a carbon-based polymer.

28. The process of claim 27 which further comprises the step of adding at least one other additive selected from the group consisting of
a hindered phenol, a hindered amine light stabilizer, a benzotriazole, a thioester, a second phosphite, an alkanolamine, a metal stearate and a hydrotalcite.

* * * * *